(12) United States Patent
Claussen et al.

(10) Patent No.: US 6,758,088 B2
(45) Date of Patent: Jul. 6, 2004

(54) ACTIVE ADAPTATION OF CONTROL ALGORITHMS FOR A CENTRAL TIRE INFLATION SYSTEM

(75) Inventors: Stephen P. Claussen, Richland, MI (US); Daryl J. Stacer, Portage, MI (US); James A. Beverly, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 98 days.

(21) Appl. No.: 10/127,179

(22) Filed: Apr. 22, 2002

(65) Prior Publication Data

US 2003/0192372 A1 Oct. 16, 2003

(51) Int. Cl.[7] .............................................. G01M 17/02
(52) U.S. Cl. ...................... 73/146; 73/146.3; 152/415; 141/38
(58) Field of Search ................. 73/146–146.8, 73/702; 141/38, 4; 152/416, 415, 417

(56) References Cited

U.S. PATENT DOCUMENTS

| | | | | |
|---|---|---|---|---|
| 4,019,552 A | * | 4/1977 | Tsuruta | 152/417 |
| 4,529,019 A | * | 7/1985 | Blevins et al. | 141/94 |
| 4,694,409 A | | 9/1987 | Lehman | 364/558 |
| 4,744,399 A | | 5/1988 | Magnuson et al. | 152/417 |
| 4,782,878 A | | 11/1988 | Mittal | 152/417 |
| 4,860,579 A | * | 8/1989 | Beverly | 73/146.2 |
| 4,898,216 A | | 2/1990 | Schultz et al. | 141/4 |
| 5,007,365 A | | 4/1991 | Hwang | 116/34 R |
| 5,121,774 A | * | 6/1992 | Hicks et al. | 141/4 |
| 5,180,456 A | | 1/1993 | Schultz et al. | 152/416 |
| 5,263,524 A | * | 11/1993 | Boardman | 152/416 |
| 5,327,346 A | | 7/1994 | Goodell | 364/426.02 |
| 5,516,379 A | | 5/1996 | Schultz | 152/415 |
| 5,546,789 A | | 8/1996 | Balke et al. | 73/40 |
| 5,587,698 A | | 12/1996 | Genna | 340/442 |
| 5,629,874 A | | 5/1997 | Mittal | 364/558 |
| 5,674,332 A | | 10/1997 | Battocchio | 152/416 |
| 5,767,398 A | | 6/1998 | Naedler | 73/146.2 |
| 5,850,036 A | * | 12/1998 | Giromini et al. | 73/40 |
| 5,891,277 A | | 4/1999 | Bachhuber | |
| 6,067,850 A | | 5/2000 | Lang et al. | 73/146.8 |
| 6,144,295 A | | 11/2000 | Adams et al. | 340/442 |
| 6,218,935 B1 | | 4/2001 | Corcoran et al. | 340/444 |
| 6,286,565 B1 | * | 9/2001 | Pike | 141/38 |

FOREIGN PATENT DOCUMENTS

EP        0 531 069 A2    3/1993

OTHER PUBLICATIONS

"Tire Maintenance System Installation and Troubleshooting", Dana Corporation, Jul. 2001.

* cited by examiner

Primary Examiner—Andrew H. Hirshfeld
Assistant Examiner—Marissa Ferguson
(74) Attorney, Agent, or Firm—Dykema Gossett PLLC

(57) ABSTRACT

A method for control of a tire pressure management system (or central tire inflation system) is provided which enables active adaptation of control variables in the system in response to variations in air line volume. The air line volume in a conduit between an air source and a vehicle tire is determined. Subsequently, one or more values for control variables are adjusted in response to the air line volume and various parameters associated with the system are determined in response to the adjusted values of the control variables.

20 Claims, 3 Drawing Sheets

ACTIVE ADAPTATION OF CONTROL ALGORITHMS FOR A CENTRAL TIRE INFLATION SYSTEM

BACKGROUND OF THE INVENTION

1. Field of the Invention

This invention relates to vehicle tire pressure management systems and, in particular, to a system and method for adapting control algorithms in vehicle tire pressure management systems.

2. Discussion of Related Art

Conventional tire pressure management systems, also known as central tire inflation systems (CTIS systems), on-board inflation systems and traction systems, are well known in the prior art. Generally, these systems employ a pneumatically controlled wheel valve that is affixed to each vehicle wheel assembly for controlling tire pressure in response to pressure signals from an air control circuit. The air control circuit is connected to each wheel valve via a rotary seal assembly associated with each wheel valve. Tire pressure is monitored by means of a sensor that is positioned in a conduit assembly in the air control circuit. When the wheel valve and certain control valves are opened, the pressure in the conduit equalizes to tire pressure which can then be sensed by the sensor. An electronic control unit reads electrical pressure signals generated by the sensor and appropriately controls the air control circuit in response thereto for inflating or deflating a selected tire.

Although prior art tire pressure management systems have functioned well for their intended purpose, the systems have a significant drawback. The electronic control unit of the system executes a number of control algorithms in the form of software routines that are used to determine a variety of parameters (e.g., tire pressure, line leak rate, and valve position) used by the system. These parameters, however, are significantly affected by the volume in the conduit of the air control circuit-a volume that varies from vehicle to vehicle depending upon such factors as the length of the vehicle and the number of axles and wheels on the vehicle. To enable accurate determinations of the parameters, therefore, conventional tire pressure management systems have required manual calibration of control variables used by the electronic control unit in response to varying air volumes for different vehicles.

The inventors herein have recognized a need for a tire pressure management system and a method for controlling such a system that will minimize and/or eliminate one or more of the above-identified deficiencies.

SUMMARY OF THE INVENTION

The present invention provides a tire pressure management system for a vehicle and a method for controlling the system.

A tire pressure management system for a vehicle in accordance with the present invention includes an air source and an air control circuit including a conduit disposed between the air source and a vehicle tire of the vehicle. The system further includes an electronic control unit configured to perform several functions: to determine a volume of the conduit; to adjust a value of a control variable responsive to the volume of the conduit; and to determine a value of a parameter of the tire pressure management system responsive to the value of the control variable. In accordance with some embodiments of the invention, the control variable may comprise a period of time or a pressure in the conduit. Further, in accordance with some embodiments of the invention, the parameter may comprise tire pressure, a leak rate in the conduit, or the position of a valve.

A method for controlling a tire pressure management system of a vehicle in accordance with the present invention includes the step of determining a volume of a conduit disposed between an air source and a vehicle tire of the vehicle. The method further includes the steps of adjusting a value of a control variable responsive to the volume and determining a value of a parameter for the tire pressure management system responsive to the value of the control variable.

A tire pressure management system and method for controlling a tire pressure management system in accordance with the present invention are advantageous. In particular, the inventive system and method enable active or dynamic adaptation of control variables used in tire pressure management systems to determine parameter values responsive to variations in air line volume. As a result, the system can be employed on a wide variety of vehicles without requiring expensive and time consuming manual calibration of the control algorithms.

These and other advantages of this invention will become apparent to one skilled in the art from the following detailed description and the accompanying drawings illustrating features of this invention by way of example.

DETAILED DESCRIPTION OF ONE OR MORE EMBODIMENTS OF THE INVENTION

Figure 1:
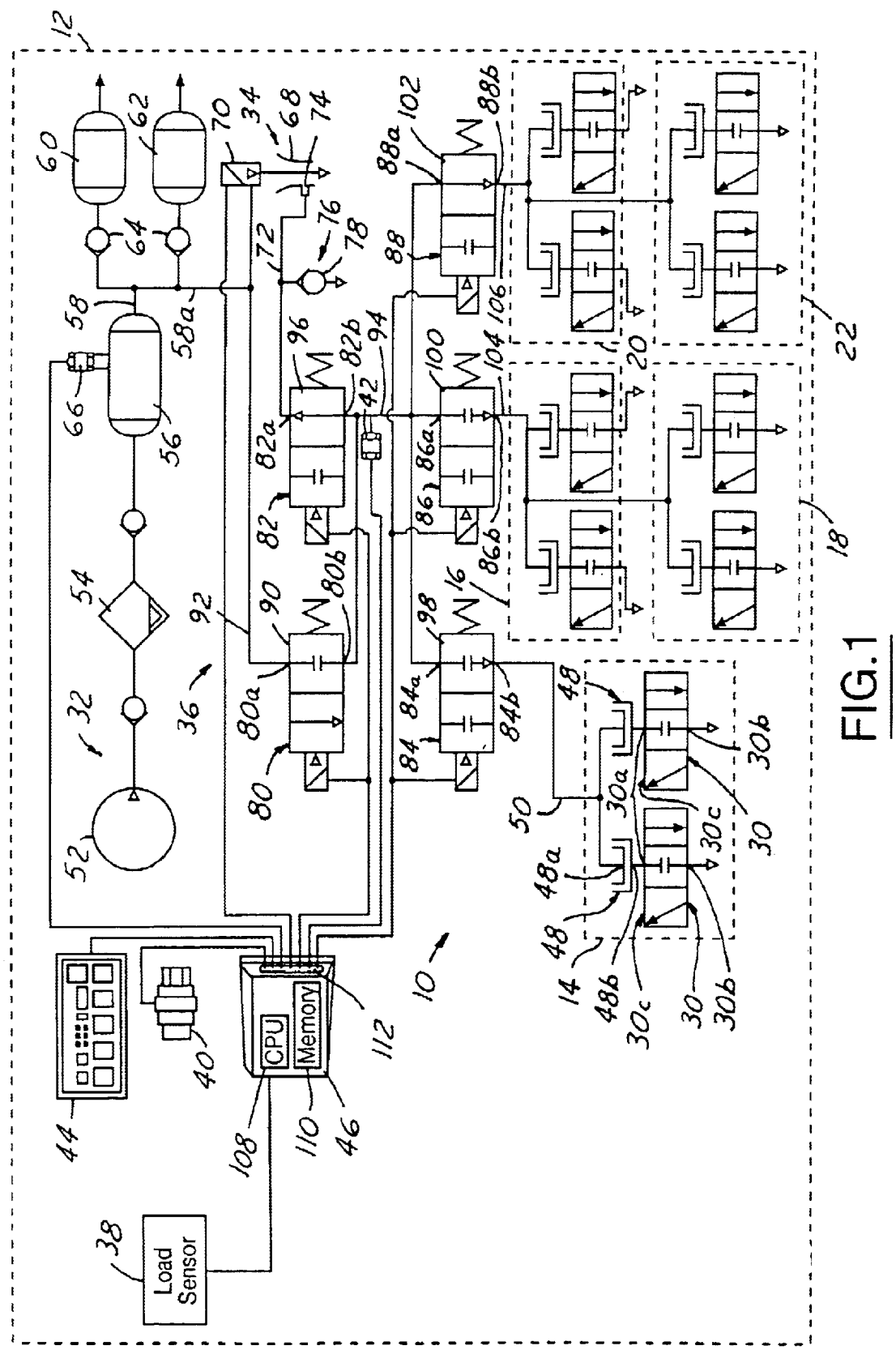
FIG. 1 is a diagrammatic view illustrating a tire pressure management system for a vehicle in accordance with the present invention.

Referring now to the drawings wherein like reference numerals are used to identify identical components in the various views, FIG. 1 illustrates a tire pressure management system 10 for a vehicle 12 (shown diagrammatically by a dotted line) in accordance with the present invention. In the illustrated embodiment, vehicle 12 comprises a tractor-trailer. It should be understood, however, that the inventive system may be used in connection with a wide variety of vehicles including automobiles.

Figure 2:
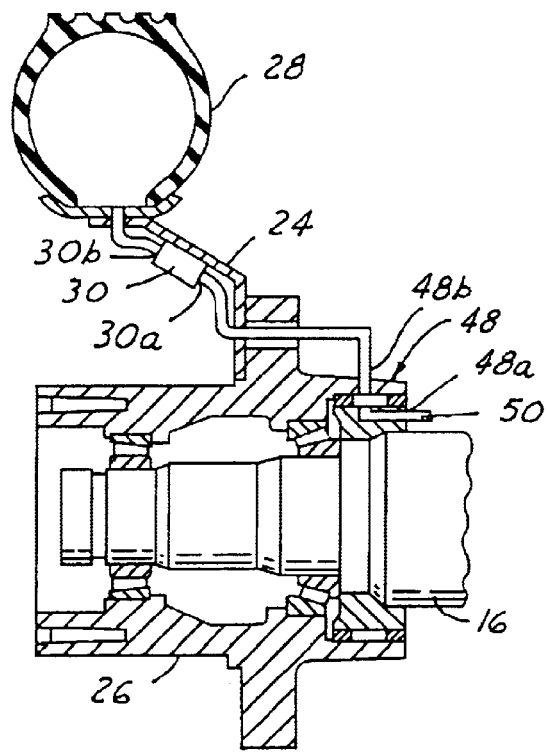
FIG. 2 is a sectional view of a conventional vehicle wheel assembly.

Vehicle 12 may include a plurality of axles including a steer axle represented by dotted line 14, a tandem axle assembly having drive axles represented by dotted lines 16, 18 and another tandem axle assembly having trailer axles represented by dotted lines 20, 22. Referring to FIG. 2, each axle of vehicle 12, such as drive axle 16, may include wheels 24 affixed to wheel hubs 26 disposed at each outboard end of the axle and rotationally supported on the axle. Each wheel 24 of vehicle 12 may include one or more inflatable tires 28 mounted thereon.

Referring again to FIG. 1, a system 10 in accordance with the present invention will be described. System 10 is provided to monitor and control pressure within each tire 28 of vehicle 12. System 10 may include wheel valve assemblies 30, an air source 32, a vacuum source 34, an air control circuit 36, one or more load sensors 38, a speed sensor 40, a pressure sensor 42, an operator control device 44, and an electronic control unit (ECU) 46.

Wheel valve assemblies 30 are provided to control the flow of pressurized air into and out of tires 28. A valve assembly 30 is mounted to each end of the each axle 14, 16, 18, 20, 22 and is connected to the remainder of system 10 through a rotary seal connection 48. Wheel valve assembly 30 is conventional in the art and may comprise the wheel valve assembly described and illustrated in either U.S. Pat. No. 5,253,687 or U.S. Pat. No. 6,250,327, the entire disclosures of which are incorporated herein by reference. Rotary seal assembly 48 is also conventional in the art and may comprise the rotary seal assembly described and illustrated in U.S. Pat. No. 5,174,839, the entire disclosure of which is incorporated herein by reference. Referring again to FIG. 2, wheel valve assembly 30 may include an inlet port 30a coupled to a rotatable part 48b of rotary seal assembly 48, an outlet port 30b in fluid communication with the interior of tire 28, and an exhaust port 30c (best shown in FIG. 1). Rotary seal assembly 48 may further include a non-rotatable port 48a connected to a conduit 50 of air control circuit 36. Valve assembly 30 may assume a closed position (illustrated in FIG. 1) when the air pressure at inlet port 30a is substantially atmospheric, an open position connecting inlet port 30a and outlet port 30b when the air pressure at inlet port 30a is a positive pressure, and an exhaust position connecting outlet port 30b and exhaust port 30c when the air pressure at inlet port 30a is a negative pressure.

Air source 32 provides positive pressurized air to system 10 and tires 28. Air source 32 is conventional in the art and may comprise a vehicle air brake pressure source including a pump 52, an air dryer 54, and a first air tank 56 connected via a conduit 58 to the brake system air tanks 60, 62 and to the air control circuit 36 via a branch conduit 58a. Check valves 64 prevent sudden loss of air pressure in brake tanks 60, 62 in the event of upstream pressure loss. A pressure sensor 66 is used to monitor pressure within tank 56 and provides a pressure indicative signal to ECU 46.

Vacuum source 34 provides a negative pressure in system 10 to decrease air pressure within tires 28 of vehicle 12. Vacuum source 34 is also conventional in the art and may include a vacuum generator 68 controlled through a solenoid valve 70. A low pressure zone is produced by passing air through a venturi like portion of vacuum generator 68. Upon energization of solenoid valve 70 to an open position via a control signal from ECU 46, a vacuum or negative air pressure, relative to atmospheric pressure, is produced in a conduit 72 that has a small orifice 74 disposed proximate the low pressure zone produced by generator 68. Conduit 72 is also connected to a one-way vent valve 76 to effect rapid venting of positive air pressure in conduit 72. Vent valve 76 includes a valving member 78 that is drawn to a closed position in response to negative air pressure in conduit 72 and is moved to an open position in response to positive pressure air in conduit 72.

Air control circuit 36 is provided to direct the flow of pressurized air within system 10 for use in controlling pressure within tires 28 of vehicle 12. Control circuit 36 may include a pair of pressure control valves 80, 82 and a plurality of axle distribution valves 84, 86, 88. In the illustrated embodiment, a single air control circuit 36 is used to control pressure in all of the tires 28 of vehicle 12. It should be understood, however, that control circuit 36-along with other portions of system 10 may be replicated so that, for example, one control circuit 36 is used to control tire pressures in the tractor portion of vehicle 12 and another control circuit 36 is used to control tire pressure in the trailer portion of vehicle 12.

Pressure control valve 80 directs positive pressurized air from air source 32 to tires 28 of vehicle 12. Valve 80 may comprise a conventional two position-two way, solenoid controlled and pilot air operated valve. Valve 80 includes a valving member 90 that is spring biased to a closed position as illustrated in FIG. 1. The valving member 90 is moved to an open position in response to energization of its solenoid via control signals from ECU 46. Valve 80 includes a first port 80a coupled to a conduit 92 leading to air source 32. Valve 80 includes a second port 80b coupled to another conduit 94 leading to axle distribution valves 84, 86, 88.

Pressure control valve 82 vents control circuit 36. Valve 82 is conventional in the art and may also comprise a two position-two way, solenoid controlled and pilot air operated valve. Valve 82 includes a valving member 96 that is spring biased to an open position as illustrated in FIG. 1. The valving member 96 is moved to a closed position in response to energization of its solenoid via control signals from ECU 46. Valve 82 includes a first port 82a coupled to conduit 72 leading to orifice 74. Valve 82 includes a second port 82b coupled to conduit 94 leading to axle distribution valves 84, 86, 88.

Axle distribution valves 84, 86, 88 are provided to limit the supply of positive pressurized air to, or the release of air from, the tires 28 of one or more axles 14, 16, 18, 20, 22 of vehicle 12. Valves 84, 86, 88 are conventional in the art and may comprise two position two-way, solenoid controlled and pilot air operated valves. Valves 84, 86, 88 direct the flow of air to and from the tires 28 of axles 14, 16 and 18, and 20 and 22, respectively. Each of valves 84, 86, 88 includes a valving member 98, 100, 102, respectively, that is spring-biased to an open position as illustrated in FIG. 1 and which is moved to a closed position in response to energization of the associated solenoid via electrical signals from ECU 46. Each of valves 84, 86, 88 further includes a first port 84a, 86a, 88a, respectively coupled to conduit 94. Finally, each of valves 84, 86, 88 includes a second port 84b, 86b, 88b, respectively, leading to a corresponding conduit 50, 104, 106 for each axle or tandem axle of vehicle 12. Although axle distribution valves 84, 86, 88 are used in the illustrated embodiment, it should be understood that individual tire distribution valves could be used in conjunction with axle distribution valves 84, 86, 88 or as an alternative to axle distribution valves 84, 86, 88 to further control the flow of air to and from individual tires 28 of vehicle 12. Further, although only three axle distribution valves 84, 86, 88 are illustrated in the disclosed embodiment, it should be understood that the number of axle distribution valves may be varied depending upon the number of axles of vehicle 12 and to allow for greater individual control of the tires 28 of vehicle 12.

Load sensors 38 provide an indication as to the load on vehicle 12 (and, consequently, the tires 28 of vehicle 12) or the load on some portion of vehicle 12 (and, consequently, select tires 28 of vehicle 12). Load sensors 38 are conventional in the art and load sensing may be provided in a variety of known ways, including through analysis of pneumatic pressures in the suspension of vehicle 12, analysis of powertrain parameters, the use of displacement transducers, or the implementation of load beams and strain gauges. Each load sensor 38 may provide on or more load indicative signals to ECU 46 indicative of the load bearing on vehicle 12 or a portion thereof.

Speed sensor 40 is provided to measure the speed of vehicle 12 in order to control deflection levels for tires 28.

Sensor 40 is conventional in the art and provides a speed indicative signal to ECU 46.

Pressure sensor 42 is provided to sense pressure in conduit 94. Sensor 42 is conventional in the art. Although sensor 42 is disposed within conduit 94 in the illustrated embodiment, it should be understood that the location of sensor may be varied within air control circuit 36 without departing from the spirit of the present invention. Sensor 42 generates a signal indicative of the pressure within conduit 94 and provides the signal to ECU 46 for a purpose described in greater detail herein below.

Operator control device 44 may be provided to allow the operator of vehicle 12 to exert at least some level of control over system 10. Device 44 is conventional in the art and may include a plurality of input/output devices such as a keypad, a touch screen, switches or similar input devices and a display screen, a sound generator, lights or similar output devices. Thus device 44 includes means for an operator of vehicle 12 to transmit control signals to ECU 46 to adjust pressure levels within tires of vehicle 12.

Figure 3:
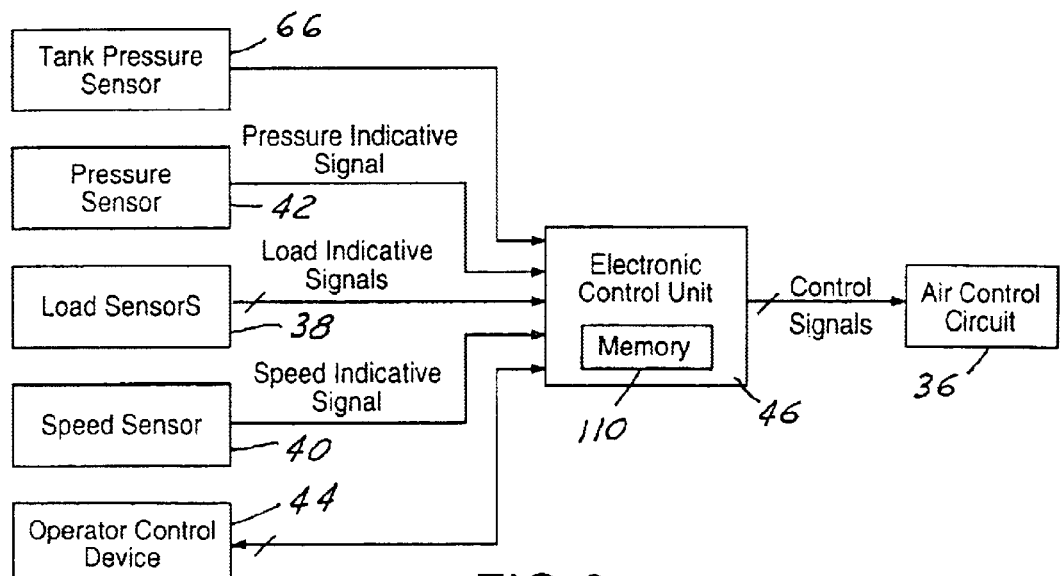
FIG. 3 is a block diagram illustrating several of the components of the system of FIG. 1.

Referring to FIG. 3, ECU 46 is provided to control air control circuit 36. ECU 46 may comprise a programmable microprocessor or microcontroller or may comprise an application specific integrated circuit (ASIC). ECU 46 may include a central processing unit (CPU) 108, a memory 110, and an input/output interface 112. Through interface 112, ECU 46 may receive a plurality of input signals including signals generated by sensors 38, 40, 42, 66 and operator control device 48. Also through interface 112, ECU 46 may generate a plurality of output signals including one or more signals used to control device 48 and valves 80, 82, 84, 86, 88.

Figure 4:
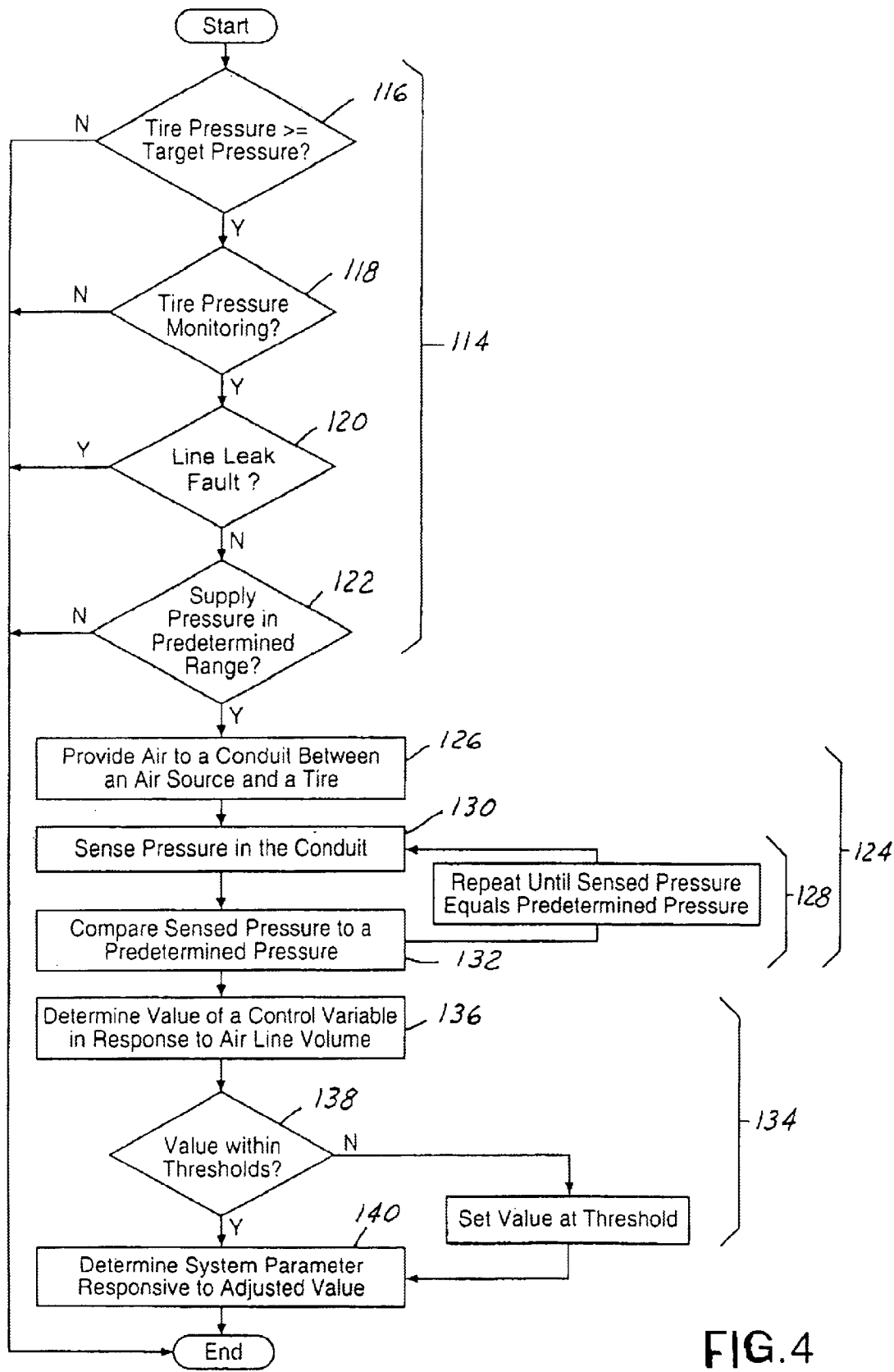
FIG. 4 is a block diagram illustrating a method for controlling a tire pressure management system in accordance with the present invention.

Referring now to FIG. 4, one embodiment of a method for controlling tire pressure management system 12 in accordance with the present invention is illustrated. The method or algorithm may be implemented by system 12 wherein ECU 46 is configured to perform several steps of the method by programming instructions or code (i.e., software). The instructions may be encoded on a computer storage medium such as a conventional diskette or CD-ROM and may be copied into the memory 110 of ECU 46 using conventional computing devices and methods. It should be understood that FIG. 4 represents only one embodiment of the inventive method. Accordingly, the particular steps and substeps illustrated are not intended to be limiting in nature. The method may be implemented using steps and substeps that are different in substance and number from those illustrated in FIG. 4.

The inventive method may begin with the step 114 of verifying several preconditions to executing the remaining steps of the method. In particular step 114 may first include the substep 116 of determining whether the pressure in one or more of tires 28 exceeds a predetermined target pressure. Referring to FIG. 1, ECU 46 may generate control signals to open supply valve 80 and one of axle distribution valves 84, 86, 88. Air pressure within conduit 94 and one of conduits 50, 104, 106 will stabilize to the pressure in tires 28. Sensor 42 provides a signal indicative of the pressure in conduit 94 to ECU 46 and ECU 46 may then compare the sensed pressure to the target tire pressure. If the sensed pressure is less than the target tire pressure, the routine ends. If the sensed pressure is greater than the target tire pressure, the routine continues.

Referring again to FIG. 4, step 114 may continue with the substep 118 of determining whether system 10 is engaged in tire pressurization or whether system 10 is engage in routine tire pressure monitoring. If system 10 is engaged in tire pressurization, the routine ends. If system 10 is engaged in tire pressure monitoring, the routine continues.

Step 114 may continue with the substep 120 in which it is determined whether a line leak exists in air control circuit 36. Referring to FIG. 1, sensor 42 provides signals indicative of pressure in conduit 94 to ECU 46 over a period of time enabling ECU 46 to monitor drops in pressure. ECU 46 can then determine, in accordance with predetermined conditions, whether a line leak exists in control circuit 36. If a line leak does exist, the routine ends. If a line leak does not exist, the routine continues.

Referring again to FIG. 4, step 114 may finally include the substep 122 of determining whether the supply pressure is within a predetermined range. Referring to FIG. 1, sensors 66 and/or 42 may be used to indicate the available supply pressure. Sensors 66 and 42 provide signals to ECU 46 indicative of the pressure within tank 56 and conduit 94, respectively. If the supply pressure is outside of the predetermined range, the routine ends. If the supply pressure is within the predetermined range, the routine continues.

Referring again to FIG. 4, the inventive method may continue with the step 124 of determining a volume of a conduit, such as conduit 94, disposed between air source 32 and tires 28 of vehicle 12. Step 124 may include several substeps 126, 128. In substep 126, air is provided to the conduit 94 from air source 32. Referring to FIG. 1, ECU 46 generates a control signal to open supply valve 80 thereby allowing air into conduit 94 from conduit 58. In substep 128 ECU 46 determines a time period for the pressure in conduit 94 to reach a predetermined air pressure. Step 128 may itself include several substeps 130, 132. In substep 130, pressure sensor 42 senses the pressure in conduit 94. Then, in substep 132, ECU 46 compares the pressure to a predetermined pressure by ECU Substeps 130, 132 may be repeated a plurality of times until the pressure in conduit 94 equals the predetermined pressure.

The inventive method may continue with the step 134 of adjusting a value of a control variable responsive to the volume of conduit 94. A plurality of control variables used in determining parameter values associated with system 10 may be affected by changes in air line volume. One control variable may be referred to as "Hold Time" and comprises an estimated time period for the pressure in conduit 94 to become equal to the pressure in a tire 28. Hold Time is used in determining pressure in tire 28. As air line volume increases, Hold Time increases as well. ECU 46 may calculate Hold Time in accordance with the following formula:

$$\frac{\text{sply\_press} * \text{vol\_DetectTime} * \text{Cfg\_tireHoldTimeSlope}}{\text{Cfg\_splyMin} \, Press * 100} +$$

$$\text{Cfg\_tireHoldTimeShift}$$

wherein sply_press is the pressure of the air supplied from supply valve 32, vol_DetectTime is the time to fill the previously determined volume at a given pressure, Cfg_splyMinPress is a predetermined minimum supply pressure value and Cfg_tireHoldTimeSlope and Cfg_tireHoldTimeShift are predetermined constants.

Another control variable used in determining parameter values associated with system 10 that is affected by air line volume may be referred to as "Line Leak Time." Line Leak Time is a period of time following Hold Time in which a pressure drop in conduit 94 is monitored. Line Leak Time is used to determine the leak rate within conduit 94. As air line volume varies, the pressure drop values that are indicative of various leak sizes vary. ECU 46 may calculate Line Leak Time in accordance with the following formula:

$$\frac{sply\_press * vol\_DetectTime * Cfg\_tireLineLeakTimeSlope}{Cfg\_splyMinPress * 1000} +$$

$$Cfg\_tireLineLeakTimeShift$$

wherein sply_press is the pressure of the air supplied from supply valve 32, vol_DetectTime is the time to fill the previously determined volume at a given pressure, Cfg_splyMinPress is a predetermined minimum supply pressure value and Cfg_tireLineLeakTimeSlope and Cfg_tireLineLeakTimeShift are predetermined constants.

Another control variable used in determining parameter values associated with system 10 that is affected by air line volume is the pressure in the conduits of air control circuit 36 such as conduit 94. The pressure in conduit 94 can be used, for example, to determine the position of one of the wheel valve assemblies 30 so that it can be determined whether one of the valves is leaking air from tires 28. Typically, a small supply of bleed air is provided to conduit 94 to account for small air line leaks. A rise in pressure in conduit 94 greater than the rise caused by the bleed air is indicative of an open wheel valve assembly 30. As air line volume varies, however, the rate of pressure rise in conduit resulting from the addition of bleed air varies. ECU 46 may calculate the proper pressure value for indicating a leak in wheel valve assembly 30 in accordance with the following formula:

$$\frac{Cfg\_splyMinPress * Cfg\_ckvlvLimitSlope * 200}{sply\_press * vol\_DetectTime} +$$

$$(2 * Cfg\_ckvlvLimitShift)$$

wherein Cfg_splyMinPress is a predetermined minimum supply pressure value, sply_press is the pressure of the air supplied from supply valve 32, vol_DetectTime is the time to fill the previously determined volume at a given pressure, and Cfg_ckvlvLimitSlope and Cfg_ckvlvLimitShift are predetermined constants.

Step 134 may include several substeps 136, 138. In substep 136, ECU 46 may determine the value of a control variable responsive to the volume of conduit 94 as described for several exemplary control variables hereinabove. In substep 138, ECU 46 may compare the value for the control variable to at least one predetermined threshold value for the control variable. Preferably, ECU 46 compares the control variable value to upper and lower threshold values. Control variable values outside of the range defined by the threshold values may be indicative of an error in a component of system 10 or may subject system 10 to undesirable actions. Accordingly, if the control variable value is outside of the range defined by the threshold values, the control variable value may be set equal to the nearest threshold value.

The inventive method may finally include the step 140 of determining a value of a parameter for system 10 responsive to the adjusted value of a control variable. As mentioned hereinabove, exemplary system parameters may include pressure in tires 28 (which may be measured after Hold Time), line leak rate (which may be determined after Line Leak Time), and the position of a wheel valve assembly 30 (which may be determined responsive to the pressure in conduit 94).

A tire pressure management system and method for controlling such a system in accordance with the present invention provide significant advantages. The inventive system and method allow active, or dynamic, adaptation of control variables used in the system that are impacted by variations in air line volume. In this manner, the inventive system and method allow accurate determinations with respect to system parameters without requiring expensive and time consuming manual calibration of the system in response to changes in air line volume. The inventive system and method can therefore be used on a wide variety of vehicles without such manual calibration.

While the invention has been shown and described with reference to one or more particular embodiments thereof, it will be understood by those of skill in the art that various changes and modifications can be made without departing from the spirit and scope of the invention.

We claim:

1. A tire pressure management system for a vehicle, comprising:
   an air source;
   an air control circuit including a conduit disposed between said air source and a vehicle tire of said vehicle; and,
   an electronic control unit configured to determine a volume of said conduit, to adjust a value of a control variable responsive to said volume and to determine a value of a parameter of said tire pressure management system responsive to said value of said control variable.

2. The tire pressure management system of claim 1, further comprising a pressure sensor disposed in said conduit, said pressure sensor providing a signal indicative of pressure in said conduit to said electronic control unit.

3. The tire pressure management system of claim 1 wherein said electronic control unit is further configured, in determining said volume in said conduit, to determine a time period for a pressure in said conduit to reach a predetermined pressure.

4. The tire pressure management system of claim 1 wherein said control variable comprises a time period.

5. The tire pressure management system of claim 4 wherein said time period comprises an estimated time period for a pressure in said conduit to become equal to a pressure in said tire.

6. The tire pressure management system of claim 1 wherein said control variable comprises a pressure in said conduit.

7. The tire pressure management system of claim 1 wherein said parameter comprises pressure in said tire.

8. The tire pressure management system of claim 1 wherein said parameter comprises a leak rate in said conduit.

9. The tire pressure management system of claim 1 wherein said parameter comprises a position of a wheel valve assembly.

10. A method for controlling a tire pressure management system of a vehicle, comprising the steps of:
    determining a volume of a conduit disposed between an air source and a vehicle tire of said vehicle;
    adjusting a value of a control variable responsive to said volume; and,
    determining a value of a parameter for said tire pressure management system responsive to said value of said control variable.

11. The method of claim 10 wherein said determining step includes the substeps of:
    providing air to said conduit from an air source;
    determining a time period for said pressure in said conduit to reach a predetermined air pressure.

12. The method of claim 11 wherein said substep of determining a time period further includes the substeps of:

sensing said pressure within said conduit;

comparing said pressure to a predetermined pressure;

repeating said sensing and comparing steps until said pressure in said conduit equals said predetermined pressure.

13. The method of claim 10 wherein said adjusting step includes the substeps of:

determining said value of said control variable responsive to said volume; and, comparing said value to at least one predetermined threshold value for said control variable.

14. The method of claim 10 wherein said control variable comprises a time period.

15. The method of claim 14 wherein said time period comprises an estimated time period for a pressure in said conduit to become equal to a pressure in said tire.

16. The method of claim 10 wherein said control variable comprises a pressure in said conduit.

17. The method of claim 10 wherein said parameter comprises pressure in said tire.

18. The method of claim 10 wherein said parameter comprises a leak rate in said conduit.

19. The method of claim 10 wherein said parameter comprises a position of a wheel valve assembly.

20. A method for controlling a tire pressure management system of a vehicle, comprising the steps of:

determining a volume of a conduit disposed between an air source and a vehicle tire of said vehicle;

adjusting an estimated time period for a pressure in said conduit to become equal to a pressure in said tire; and, determining a pressure in said tire responsive to said estimated time period.

* * * * *